United States Patent Office 3,810,957
Patented May 14, 1974

3,810,957
SELECTIVELY HYDROGENATED BLOCK
COPOLYMER-POLYSTYRENE BLENDS
Hans E. Lunk, Menlo Park, Calif., assignor to
Shell Oil Company, Houston, Tex.
No Drawing. Continuation-in-part of application Ser. No. 62,698, Aug. 10, 1970, which is a continuation of application Ser. No. 463,892, June 14, 1965, both now abandoned. This application Feb. 7, 1972, Ser. No. 224,316
Int. Cl. C08f 41/12
U.S. Cl. 260—876 B                    10 Claims

ABSTRACT OF THE DISCLOSURE

Molding compositions having high impact strength and improved oxidative stability are prepared by physically blending a polymer of at least one monovinyl aromatic compound with a block copolymer prepared by selectively hydrogenating to substantially complete saturation the diene portion of a block copolymer having at least two polymer blocks of a monovinyl arene separated by at least one polymer block predominately of a conjugated diene.

This invention relates to high impact thermoplastic compositions of polymers of monovinyl aromatic hydrocarbons and to a process for preparing them. More particularly, the invention provides a process for preparing high impact thermoplastic molding compositions, especially polystyrene, having improved oxidative stability.

This application is a continuation-in-part of Ser. No. 62,698, filed Aug. 10, 1970 now abandoned, which, in turn, is a continuation of Ser. No. 463,892, filed June 14, 1965, now abandoned.

BACKGROUND OF THE INVENTION

Conventionally high impact poly(monovinyl aromatic) molding compositions such as polystyrene contain polymeric styrene and a rubber polymer. It is known that good compositions may be obtained by physical blending, e.g., polystyrene with rubber or by mixing the rubber polymer with monomeric styrene and graft polymerizing the mixture. Many types of rubber materials have been employed including natural rubber, styrene-butadiene copolymer (GRS rubber) and polybutadiene. These polystyrene compositions while having acceptable high impact strength, do not have good weather resistance, that is they do not have good oxidation stability, and they deteriorate rapidly with exposure to sunlight with the concomitant reduction of the impact strength to an undesirably low value.

STATEMENT OF THE INVENTION

A principal object of the present invention is to provide high impact thermoplastic poly(monovinyl aromatic) molding compositions, having greatly improved oxidative stability. Another object is to provide a process for preparing high impact polystyrene molding compositions having improved weathering resistance, that is, resistance against oxidation and particularly against ultra-violet deterioration. Other objects will be apparent to one skilled in the art from the following disclosure and discussion.

Specifically, the invention provides a high impact resinous composition of polymerized monovinyl aromatic hydrocarbons, particularly styrene, which comprises a blend of said polymerized monovinyl aromatic hydrocarbon with a block polymer prepared by selectively hydrogenating the diene portion of a block copolymer having at least two polymer blocks of a monovinyl arene separated by at least one polymer block of a conjugated diene. The invention further provides a process for preparing high impact thermoplastic molding compositions having improved oxidation stability which comprises physically blending from 60 to 90 parts by weight of a resinous polymer of a monovinyl aromatic hydrocarbon, preferably polystyrene, with from about 10 to about 40 parts by weight of a block copolymer prepared by selectively hydrogenating the diene portion of a block polymer having at least two polymer blocks of a monovinyl arene separated by at least one polymer block of a conjugated diene.

DESCRIPTION OF THE PREFERRED EMBODIMENTS

Suitable polymers of monovinyl aromatic hydrocarbons are prepared by polymerizing at least one monoalkenyl aromatic hydrocarbon of the benzene series and include the polymers of styrene and ring-substituted styrene wherein the aromatic nucleus is substituted with one or more alkyl groups preferably containing from about 1 to 4 carbon atoms such as methyl or ethyl or with a halogen group such as a chloro group. Examples of such monomers are vinyl toluene, vinyl xylene, vinyl ethyl benzene and vinyl chlorobenzene. Suitable monomers also include the chain-substituted styrenes such as alpha-methylstyrene. Preferably, these polymers have an intrinsic viscosity of from about 0.5 to about 1.5, especially in the range from about 0.6 to about 1.0 dl./g., as determined using a 0.25 g./100 ml. solution in toluene at 30° C.

The block copolymers suitable for hydrogenation and subsequent use in the present invention have at least two polymer blocks A wherein each A represents a polymer block of a monovinyl arene, separated by at least one polymer block B wherein each B represents a polymer block of homopolymer or copolymer of a conjugated diene wherein the diene predominates. In the following discussion and description, when any block copolymer is described in which two blocks B are immediately adjacent to each other, e.g., in a polymer such as

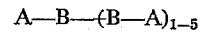

A—B—(B—A)$_{1-5}$ the adjacent blocks B are considered as a single polymer block for purposes of molecular weight. Accordingly, within the above generic description, the block copolymers suitable for hydrogenation may have a general configuration selected from A—B—A, A—(B—A)$_{2-5}$ and A—B—(B—A)$_{2-5}$ wherein A and B are defined as hereinabove.

The end blocks, A, which may comprise from about 25 to about 50% and preferably from about 32 to about 45% of the total block copolymer, have molecular weights from about 5,000 to about 75,000, and more preferably from about 8,000 to about 60,000; and any nonadjacent center blocks, B, have an average molecular weight from about 30,000 to about 300,000, and more preferably from about 50,000 to about 300,000. In conformance with preceding statements, any blocks B adjacent to each other have a total average molecular weight from about 30,000 to about 300,000 and more preferably from about 50,000 to about 300,000.

Preferably, the block copolymers, prior to selective hydrogenation are those in which each polymer block B is a homopolymer or copolymer of at least one conjugated diene hydrocarbon, preferably alkadiene, having 4 to 10 carbon atoms per molecule such as butadiene, isoprene, piperylene and ethyl butadiene or diene copolymer containing up to 35% by weight on block B of a monovinyl arene such as styrene or alpha methyl styrene distributed therein in a non-block, i.e., random or tapered configuration. Most preferred are conjugated dienes having 4 or 5 carbon atoms per molecule. Preferably, the block copolymers are those in which the end blocks, A, prior to hydrogenation (and afterwards) comprise at least one monovinyl arene such as styrene, the ring alkylated styrenes, such as t-butylstyrene, ring halogenated styrenes such as the chlorostyrenes, and alpha-methylstyrene.

A typical, but by no means exhaustive, list of suitable block polymers includes the following:

Polystyrene-polybutadiene-polystyrene
Polystyrene-polyisoprene-polystyrene
Polystyrene-polybutadiene (polybutadiene-polystyrene)$_{2-5}$
Polystyrene-(polyisoprene-polystyrene)$_{2-5}$
Polystyrene-poly(ethyl-butadiene)-polystyrene
Polystyrene-poly(random butadiene-styrene)-polystyrene
Poly(alpha-methylstyrene)-polybutadiene-poly(alpha-methylstyrene)
Poly(alpha-methylstyrene)-polyisoprene-poly(alpha-methylstyrene)
Poly(styrene-alpha-methylstyrene)-poly(butadiene-isoprene)(styrene-alpha-methylstyrene)
Poly(vinylxylene)-polybutadiene-poly(vinylxylene)

The processes for the preparation of such block copolymers do not form a part of the present invention. Briefly, however, the block copolymers are formed either by sequential polymerization in the presence of a catalyst capable of forming a "living polymer" such as butyl lithium under conditions well known in the block copolymer art or by the coupling of preformed polymer blocks.

These poly(monovinyl aromatic hydrocarbon)-poly(conjugated diene)-poly(monovinyl aromatic hydrocarbon) block copolymers are then selectively hydrogenated, i.e., the conjugated diene portion is hydrogenated to substantially complete saturation and the vinyl aromatic portion is left substantially unhydrogenated, e.g., less than 5%, preferably less than 2% hydrogenated.

The processes for hydrogenation of the block copolymers form no part of the present invention. Briefly, however, suitable catalysts comprise a reduced metal form of a member selected from the group consisting of cobalt, nickel, manganese, tungsten and molybdenum, as well as mixtures thereof, wherein said reduced metal form is obtained by reacting a compound of the above metals with a metal-compound reducing agent. Suitable organo metallic reducing agents include aluminum hydride and hydrocarbyl aluminum compounds of from 3 to 35 carbon atoms, especially trihydrocarbyl aluminum compounds of from 3 to 35 carbon atoms per molecule. The freshly reduced compositions may be prepared and used as hydrogenation catalysts in situ or may be separated prior to use. Although heating is not required for catalyst formation, temperatures of from about 0° C. and 250° C. may be employed.

The ratios of organometallic reducing agents to reducable metal compounds may range from about 0.1 to 30.1.

The catalyst may be prepared either in slurry form or mounted on a suitable support.

In general, any source of molecular metal may be employed. Metal salts may be used as well as organometallic compounds and coordination complexes. Salts of organic acids may be used with salts of alkanoic acids with from 1 to 12 carbon atoms in the alkanoate moiety being preferred. Especially preferred are compounds such as dicobalt octacarbonyl.

The polymers to be hydrogenated are preferably dissolved in a suitable solvent or in a mixture of solvents. Unsaturated solvents such as benzene or toluene may be employed, but saturated solvents such as cyclohexane, iso-octane, neopentane, and 2,4-dimethyl hexane are preferred.

It is generally possible to selectively hydrogenate to substantial completion, i.e., at least 90% saturation, the above copolymers at temperatures below about 150° C. with the above-described catalysts. Under suitable conditions at least 99% of the diene units of the copolymer are normally saturated and less than 1% and generally less than 0.5% of the arene portions of the copolymers are converted. Hydrogenation is more selective as the temperature is reduced, but hydrogenation time is correspondingly extended. Consequently, temperatures between about 25° and 150° C. are preferred for the selective hydrogenation of the diene portion of the block polymer.

As noted above, the time required for hydrogenation will depend upon the catalyst concentration, extent of hydrogenation desired and the temperature employed. In general, however, the diene portion of the copolymer is substantially completely hydrogenated in from about 0.05 to about 8 hours. As will be understood, any arene in each block B is not converted by hydrogenation.

The above discussion of the selective hydrogenation is a brief description because it alone is not novel with applicant. The hydrogenation process is described in greater detail in application Ser. No. 333,671, filed Dec. 26, 1963, by Myron G. Quam and Milton M. Wald, a continuation-in-part application of which is now U.S. 3,595,942.

In general, the block copolymers particularly useful for the present invention include the poly(monovinyl aromatic hydrocarbon)-poly(conjugated diene having from 4 to 10 carbon atoms)-poly(monovinyl aromatic hydrocarbon) which has been subsequently selectively hydrogenated to substantial completion, i.e., the conjugated diene portion is at least 90% saturated and preferably at least 95% saturated and most preferably at least 99% saturated. As noted hereinbefore, the poly(monovinyl aromatic hydrocarbon) portion is not significantly hydrogenated. The poly(monovinyl aromatic hydrocarbon) blocks, A, preferably have a molecular weight in the range from about 8,000 to about 60,000 and the poly(conjugated diene) block(s) B have a molecular weight from about 30,000 to about 300,000, with the proviso that any blocks B which are adjacent to each other are treated as a single polymer block segment having a total average molecular weight from about 30,000 to about 300,000.

An especially preferred hydrogenated block copolymer is the block polymer of polystyrene-polyisoprene-polystyrene which has been hydrogenated to a polystyrene-poly(ethylene/propylene)-polystyrene block polymer. Preferably, the polyisoprene block to be hydrogenated contains substantial, i.e., above about 70% cis 1,4 content.

Another preferred hydrogenated block copolymer is prepared by hydrogenating a polystyrene-polybutadiene-polystyrene block polymer wherein the polybutadiene is a rubbery polybutadiene having a suitable 1,2-polybutadiene up to 1,4-polybutadiene ratio, i.e., from about 30:70 to about 70:30, and especially from about 35:65 to about 55:45. The microstructure of the polybutadiene may be determined by conventional infra-red analysis according to procedure of Silas et al., Analytical Chemistry, vol. 31, pp. 529–532 (1959).

Thus, the polymer chain of the B block contains a plurality of pendant lower alkyl substituent, e.g., methyl, ethyl and the like, distributed substantially throughout, which substituent may be found on up to about 70% of the carbon atoms in the polymer chain.

The hydrogenated block polymers may be physically blended with the poly(monovinyl aromatic hydrocarbons) by any of the well-known methods such as by milling, extruding and mixing (Banbury mixer). In general, the physical blending is performed at a temperature from about 140° to about 270° C., preferably from about 170 to 250° C. Higher and lower temperatures may also be employed.

Although the ratio of hydrogenated block polymer to poly(monovinyl aromatic hydrocarbon) can vary quite widely depending upon the desired end use of the molding compositions, in general, from about 10 to 40 parts by weight of the hydrogenated block copolymer is physically blended with from 60 to 90 parts by weight of the poly(monovinyl aromatic hydrocarbon), with from about 15 to 30 parts by weight of the hydrogenated block copolymer to about 70 to 85 parts by weight of poly(monovinyl aromatic hydrocarbon) being preferred. Generally, selectively hydrogenated block copolymers having higher total molecular weight B blocks, e.g., above about 90,000, are more effective for enhancing impact strength at lower concentrations in the final blend.

Inert ingredients such as conventional filler materials for the polystyrene, e.g., silicas, carbon black, talc, titanium oxides and the like; antioxidants such as, e.g., 2,6-di-tert-butyl-4-methyl phenol and/or trisnonylphenyl phosphite; and light stabilizers such as the 2-alkyl-2,3,4-benzotriazoles may be added to the molding composition. They may be added at any convenient time during the preparation of the molding composition of this invention.

It is also generally desirable to add a lubricant in order to improve moldability of the composition, and any of the known lubricants may be used in this invention. Examples of lubricants include ester lubricants such as butyl stearate, mineral oil, paraffin wax and combinations of these lubricants.

Advantages of the present invention are illustrated by the following examples. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight. Impact data are in ft. lbs./in. of notch at 23° C.

EXAMPLE I

This example illustrates the high impact strength exhibited by the novel polystyrene molding compositions of the present invention.

A polystyrene-poly(ethylene/propylene) - polystyrene block polymer having a molecular weight of about 30,000–100,000–30,000 was prepared by selectively hydrogenating the diene portion to substantial completion, i.e., (99%+), a polystyrene-polyisoprene-polystyrene block polymer as a 7% cyclohexane cement at 800 p.s.i. and 160° C. using a catalyst comprising cobalt acetate reduced with aluminum triethyl with an aluminum:cobalt ratio 2:1.

Various amounts of this block copolymer were physically blended with polystyrene in a 6-inch roll mill at 185° C. for 10 minutes.

Styrene molding compositions were also prepared by physically blending an ethylene-propylene rubber and a styrene-butadiene rubber (SBR) with polystyrene. The physical properties of these molding compositions are tabulated in Table I.

It is seen that polystyrene - poly(ethylene/propylene)-polystyrene block polymers impart excellent impact strength as well as very good hardness and yield strength and are superior to conventional polystyrene molding compositions employing conventional rubbers.

TABLE I

| Polyvinyl aromatic molding composition | Izod impact strength, ft.-lbs./in. | Hardness Rockwell M | Yield strength, p.s.i. | Elongation, percent |
|---|---|---|---|---|
| 85 parts polystyrene plus 15 parts of polystyrene-poly(ethylene/propylene)-polystyrene block polymer (SEPS)[1] | 0.86 | 10 | 3,640 | 5 |
| 80 parts polystyrene plus 20 parts SEPS | 1.24 | 2 | 3,380 | 8 |
| 75 parts polystyrene plus 25 parts SEPS | 3.36 | −8 | 3,050 | 8 |
| 70 parts polystyrene plus 30 parts SEPS | 4.25 | −14 | 2,450 | 40 |
| 80 parts polystyrene plus 20 parts ethylenepropylene rubber[2] | 0.29 | −11 | | |
| 70 parts polystyrene plus 30 parts ethylenepropylene rubber | 0.21 | −42 | | |
| 75 parts polystyrene plus 25 parts of SBR[3] | 1.82 | −20 | 2,850 | 40 |

[1] SEPS=a polystyrene-poly(ethylene/propylene)-polystyrene block polymer having a molecular weight of 30,000–100,000–30,000.
[2] A copolymer containing 60% ethylene and 40% propylene, I.V. 2.0 dl./g.
[3] S-1006 containing 23% styrene and 77% butadiene.

EXAMPLE II

A polystyrene molding composition was prepared by blending 25 parts by weight of the polystyrene-poly(ethylene/propylene)-polystyrene block polymer in Example I (SEPS) with 75 parts by weight of polystyrene. Another polystyrene molding composition was prepared by blending 25 parts by weight of an SBR rubber with 75 parts by weight of polystyrene.

The initial impact strength of the polystyrene molding compositions were determined. The molding compositions were then exposed in the Fadeometer for 1,000 hours and the impact strength again determined. The results of this experiment is tabulated in Table II.

TABLE II

| Polystyrene molding composition | Initial izod impact strength, ft.-lbs./in. | Impact izod strength after 1,000 hours exposure | Retention of impact strength, percent |
|---|---|---|---|
| Polystyrene-SBR blend | 1.82 | 0.65 | 36 |
| Polystyrene-SEPS blend | 3.36 | 3.26 | 97 |

EXAMPLE III

This example illustrates that selective hydrogenation of the conjugated diene portions of the block copolymer results in good impact properties which are not obtained with fully hydrogenated block copolymer.

A series of blends were prepared from a commercial homopolystyrene and various amounts of a block copolymer of polystyrene-polybutadiene-polystyrene having a molecular weight of about 25,000–100,000–25,000 wherein the polybutadiene portion, which contained about 40% by weight of 1,2 units had been hydrogenated selectively to about 99% saturation; and less than about 1% of the polystyrene end blocks had been hydrogenated (S—EB$_{40}$—S) wherein EB represents an ethylene butene copolymer. The hydrogenated block polymer, therefore, contained about 33% of the original unsaturation. The blends which were prepared on an electrically heated 3 inch mill exhibited the physical properties tabulated in Table III.

This procedure was repeated to prepare blends of 16 and 26% block copolymer except that for these blends the block copolymer was the same block copolymer, however, fully hydrogenated to remove essentially all of the unsaturation from the polystyrene end blocks, thereby chemically converting them to polymer blocks of vinyl cyclohexane (C—EB$_{40}$—C). The composition and physical properties of these blends is also shown in Table III.

TABLE III

| | Polyvinyl aromatic molding composition | Izod impact strength, ft.-lbs./in. | Hardness Rockwell R | Hardness Rockwell M |
|---|---|---|---|---|
| A | Polystyrene base polymer | 0.2 | 120 | 72 |
| B | Blends with selectively hydrogenated block copolymer, 90 parts polystyrene, 10 parts polystyrene-poly(ethylene/butylene)-polystyrene (S—EB$_{40}$—S). | 0.3 | 113 | 35 |
| | 84 parts polystyrene, 16 parts (S—EB$_{40}$—S). | 1.3 | 104 | 2.6 |
| | 80 parts polystyrene, 20 parts (S—EB$_{40}$—S). | 2.1 | 99 | −7.5 |
| | 74 parts polystyrene, 26 parts (S—EB$_{40}$—S). | 3.6 | 88 | −13.6 |
| C | Blends with fully hydrogenated block copolymers, 84 parts polystyrene, 16 parts poly(vinylcyclohexane)poly(ethylene/butylene)-poly(vinylcyclohexane) (C—EB$_{40}$—C). | 0.4 | 100 | 1.8 |
| | 74 parts polystyrene, 26 parts (C—EB$_{40}$—C). | 0.4 | 77 | −15.8 |

To illustrate the suitability of the compositions with selectively hydrogenated block copolymer for injection molding an additional blend of 20 parts by weight of the above selectively hydrogenated block copolymer (S—EB₄₀—S)

and 80 parts by weight of polystyrene was prepared in a Banbury mixer, subsequently extruded through a strand die and chopped into nibs. The blend which was then injection molded had the following tensile properties:

| | |
|---|---|
| Tensile modulus, p.s.i. | 390,000 |
| Yield strength, p.s.i. | 4,400 |
| Breaking strength, p.s.i. | 3,700 |
| Elongation at break, percent | 18+ |

EXAMPLE IV

To further illustrate the invention a series of blends were prepared from a commercial homopolystyrene and various amounts of a block copolymer of polystyrene-polybutadiene-polystyrene having a molecular weight of 25,000–88,000–23,000 wherein the polybutadiene portion contained about 40% 1,2 units had been selectively hydrogenated to about 99% saturation and less than about 1% of the polystyrene end blocks had been hydrogenated. The block copolymer, therefore, contained about 35% of the original unsaturation. The blends were prepared by mixing in a Brabender Plasticorder for ten minutes at about 200° C. under nitrogen. Properties of the blends may be seen in Table IV. The above procedure was repeated except that the same block copolymer had been hydrogenated to remove approximately 75% of the unsaturation of polystyrene end blocks in addition to full hydrogenation of the center block. This additionally hydrogenated block copolymer therefore, contained about 9% of the original unsaturation. The composition and properties of these blends also appear in Table IV.

TABLE IV

| Polyvinyl aromatic molding composition | Izod impact strength, ft.-lbs./in. | Hardness Rockwell R | Hardness Rockwell M |
|---|---|---|---|
| A. Blends with selectively hydrogenated block copolymer 84 parts polystyrene, 16 parts polystyrene-poly(ethylene/butylene)-polystyrene (S—EB₄₀—S) | 1.1 | 101 | 3.2 |
| 80 parts polystyrene, 20 parts (S—EB₄₀—S) | 1.4 | 94 | −9.4 |
| 74 parts polystyrene, 26 parts (S—EB₄₀—S) | 1.9 | 77 | −14 |
| B. Blends with additionally hydrogenated block copolymer, 84 parts polystyrene, 16 parts poly(vinylcyclohexane/styrene)-poly(ethylene/butylene)-poly(vinylcyclohexane/styrene) (CS—EB₄₀—CS) | 0.4 | 94 | 5.6 |
| 80 parts polystyrene, 20 parts (CS—EB₄₀—CS) | 0.4 | 90 | −9.1 |
| 74 parts polystyrene, 26 parts (CS—EB₄₀—CS) | 0.4 | 65 | −18 |

What is claimed is:

1. A process for preparing a high impact thermoplastic molding composition having improved oxidation stability which comprises physically blending from 70 to 85 parts by weight of a resinous polymer consisting of at least one monovinyl aromatic hydrocarbon selected from styrene, α-methylstyrene and ring substituted styrenes wherein the aromatic nucleus bears at least one substituent selected from alkyl groups of 1 to 4 carbon atoms and halogens, with from about 30 to about 15 parts by weight of a selectively hydrogenated block copolymer having at least two polymer blocks A separated by at least one polymer block B wherein prior to hydrogenation, each A is a polymer block of a monovinyl arene having a molecular weight in the range from about 5,000 to about 75,000 said blocks A comprising from 25 to 50% by weight of the total block copolymer and B is a polymer block having a molecular weight from about 30,000 to about 300,000 formed from a conjugated diene selected from homopolymers of at least one conjugated diene having 4 to 10 carbon atoms per molecule and random and tapered copolymers of said conjugated diene with up to 35% by weight on block B of a monovinyl arene, with the proviso that any adjacent blocks B are treated as a single polymer block segment having a total segment molecular weight from about 30,000 to about 300,000; and after hydrogenation the diene portion of said block copolymer is at least 95% saturated, and less than about 2% of the arene blocks are converted.

2. A high impact thermoplastic molding composition having improved oxidation stability comprising a physical blend of
   (a) 70 to 85 parts by weight of a resinous polymer consisting of at least one monovinyl aromatic hydrocarbon selected from styrene, α-methylstyrene and ring substituted styrene wherein the aromatic nucleus bears at least one substituent selected from alkyl groups of 1 to 4 carbon atoms and halogens; and
   (b) 30 to 15 parts by weight of a selectively hydrogenated block copolymer having at least two polymer blocks A separated by at least one polymer block B wherein, prior to hydrogenation, A is a polymer block of a monovinyl arene and having a molecular weight in the range from about 5,000 to about 75,000; said blocks A comprising from 25 to 50% by weight of the total block copolymer and B is a polymer block having a molecular weight from about 30,000 to about 300,000 formed from a conjugated diene selected from homopolymers of at least one conjugated diene having from 4 to 10 carbon atoms per molecule and random and tapered copolymers of said conjugated diene with up to 35% by weight of a monovinyl arene and with the proviso that adjacent blocks B are treated as a single polymer block segment having a total segment molecular weight from about 30,000 to about 300,000; and after hydrogenation the diene portion of said block copolymer is at least 95% saturated and less than about 2% of the arene blocks are converted.

3. A composition as in claim 2 wherein the resinous polymer is selected from polymers of styrene, alpha methyl styrene and mixtures thereof.

4. A composition as in claim 2 wherein B is a polymer block of a conjugated diene having 4 or 5 carbon atoms.

5. A composition as in claim 2 wherein the resinous polymer is polystyrene and the block copolymer prior to hydrogenation has the configuration polystyrene-polybutadiene-polystyrene wherein the polybutadiene has a ratio of 1,2 polybutadiene to 1,4 polybutadiene from about 30:70 to about 70:30.

6. A composition as in claim 2 wherein the block copolymer prior to hydrogenation is polystyrene-polyisoprene-polystyrene and wherein the polyisoprene portion is selectively hydrogenated to at least 99% saturation.

7. A composition as in claim 2 wherein in the block copolymer blocks A are polymer blocks of monomers selected from styrene, alpha methyl styrene and mixtures thereof and having a molecular weight in the range from about 8,000 to about 60,000 and block B is a polymer block having a molecular weight from about 50,000 to about 300,000 formed from a conjugated diene having 4 or 5 carbon atoms per molecule, with the proviso that any adjacent blocks B are treated as a single polymer block segment having a total segment molecular weight from about 50,000 to about 300,000 and after hydrogenation the diene portion of said block copolymer is at least 95% saturated and less than about 1% of the arene portions are converted.

8. A composition as in claim 2 wherein the block copolymer blocks A are alpha methyl styrene blocks.

9. A composition as in claim 2 wherein the block copolymer blocks A are polymer blocks of styrene.

10. A composition as in claim 2 wherein the resinous polymer is polystyrene and the block copolymer prior to hydrogenation has the general configuration selected from A—B—A, A(B—A)$_{2-5}$ and A—B(B—A)$_{2-5}$ wherein A represents a polymer block of a monovinyl arene said end blocks A together comprising from 32 and 45% of the total block copolymer and, B represents a polymer block of a homopolymer of an alkadiene having 4 or 5 carbon atoms.

References Cited
UNITED STATES PATENTS

| 3,231,635 | 1/1966 | Holden et al. | 260—876 |
| 3,299,174 | 1/1967 | Kuhre et al. | 260—876 |

MURRAY TILLMAN, Primary Examiner

C. J. SECCURO, Assistant Examiner

U.S. Cl. X.R.

260—28.5 B, 41.5 R, 41.5 A, 45.7 P, 45.95, 878 B, 880 B